US007966773B2

(12) United States Patent
Lin

(10) Patent No.: US 7,966,773 B2
(45) Date of Patent: Jun. 28, 2011

(54) WALL EDGE VORTEX SUPPRESSOR

(75) Inventor: Jason JianXiong Lin, Cary, NC (US)

(73) Assignee: Renscience IP Holdings Inc., Raleigh, NC (US)

( * ) Notice: Subject to any disclaimer, the term of this patent is extended or adjusted under 35 U.S.C. 154(b) by 0 days.

(21) Appl. No.: 12/903,528

(22) Filed: Oct. 13, 2010

(65) Prior Publication Data
US 2011/0099920 A1 May 5, 2011

Related U.S. Application Data

(62) Division of application No. 11/286,855, filed on Nov. 26, 2005, now Pat. No. 7,823,335.

(60) Provisional application No. 60/636,083, filed on Dec. 15, 2004.

(51) Int. Cl.
*E04D 3/38* (2006.01)

(52) U.S. Cl. ........................ 52/58; 52/84; 52/300; 52/60

(58) Field of Classification Search ................ 52/24, 57, 52/58, 60, 62, 84, 94, 95, 97, 101, 300; D25/56, D25/142; 244/129.1, 199.1, 199.4, 200.1
See application file for complete search history.

(56) References Cited

U.S. PATENT DOCUMENTS

| 397,534 | A | 2/1889 | Carroll |
| 417,270 | A | 12/1889 | Nelson |
| 1,316,968 | A | 9/1919 | Neill et al. |
| 2,021,929 | A | 11/1935 | Voigt |
| 2,123,967 | A | 7/1938 | Richter |
| 2,206,040 | A | 7/1940 | Ludington |
| 2,270,537 | A | 1/1942 | Ludington |
| 2,270,538 | A | 1/1942 | Ludington |
| 2,473,400 | A | 6/1949 | Waara |
| 2,968,128 | A | 1/1961 | Pelican |
| 3,012,376 | A | 12/1961 | Reddy et al. |
| 3,024,573 | A | 3/1962 | McKinley |
| 3,187,464 | A | 6/1965 | Sharp |
| 3,280,524 | A | 10/1966 | Hull |
| 3,717,968 | A | 2/1973 | Olsen et al. |
| 3,742,668 | A | 7/1973 | Oliver |

(Continued)

FOREIGN PATENT DOCUMENTS

JP 5-133141 5/1993

(Continued)

OTHER PUBLICATIONS

U.S. Appl. No. 12/320,867, filed Feb. 6, 2009: specification and abstract (11 pages), drawings (4 pages), and Preliminary Amendment filed Feb. 6, 2009 (11 pages); Office Action dated Nov. 11, 2009 (18 pages); Reply filed Apr. 12, 2010 (19 pages).

(Continued)

*Primary Examiner* — Richard E Chilcot, Jr.
*Assistant Examiner* — Mark R Wendell
(74) *Attorney, Agent, or Firm* — Finnegan, Henderson, Farabow, Garrett & Dunner, LLP

(57) ABSTRACT

An apparatus disposed along and attached to a wall edge to mitigate wind-generated vortices and suction loads on the wall, suitable and convenient for both new constructions and retrofits of existing buildings. Preferred configurations are described and include such types as wall edge cap, wall edge windscreen and wall edge wind spoiler, each utilizing a distinctive primary aerodynamic mechanism, often with optional secondary mechanisms to enhance vortex-suppressing effects.

22 Claims, 3 Drawing Sheets

U.S. PATENT DOCUMENTS

| | | | |
|---|---|---|---|
| 3,817,009 A * | 6/1974 | Elder | 52/173.1 |
| 4,005,557 A | 2/1977 | Kramer et al. | |
| 4,233,786 A | 11/1980 | Hildreth | |
| 4,461,129 A | 7/1984 | von Platen | |
| 4,549,376 A | 10/1985 | Hickman | |
| 4,598,507 A | 7/1986 | Hickman | |
| 4,641,476 A * | 2/1987 | Webb et al. | 52/60 |
| 4,665,667 A * | 5/1987 | Taylor et al. | 52/96 |
| 4,672,781 A | 6/1987 | Pichon | |
| 4,780,995 A * | 11/1988 | Gittins | 52/60 |
| 4,780,999 A | 11/1988 | Webb et al. | |
| 4,798,033 A * | 1/1989 | Weidl | 52/94 |
| 4,830,315 A | 5/1989 | Presz et al. | |
| 4,858,406 A | 8/1989 | Lane et al. | |
| 4,957,037 A | 9/1990 | Tubbesing et al. | |
| 5,016,404 A | 5/1991 | Briggs | |
| 5,031,367 A | 7/1991 | Butzen | |
| 5,050,489 A | 9/1991 | Mankowski | |
| 5,189,853 A | 3/1993 | Braine | |
| 5,414,965 A | 5/1995 | Kelley et al. | |
| D361,138 S | 8/1995 | Moore et al. | |
| 5,586,414 A * | 12/1996 | Tawzer | 52/57 |
| 5,813,179 A | 9/1998 | Koenig, Jr. et al. | |
| 5,918,423 A * | 7/1999 | Ponder | 52/57 |
| 5,927,023 A * | 7/1999 | Kittilstad | 52/60 |
| 6,044,601 A | 4/2000 | Chmela et al. | |
| 6,128,865 A | 10/2000 | Din | |
| 6,212,829 B1 | 4/2001 | Webb | |
| 6,212,836 B1 | 4/2001 | Larson | |
| 6,216,408 B1 * | 4/2001 | Davidson | 52/300 |
| 6,325,712 B1 | 12/2001 | Lawless, III et al. | |
| 6,360,504 B1 | 3/2002 | Webb et al. | |
| 6,539,675 B1 | 4/2003 | Gile | |
| 6,578,322 B2 * | 6/2003 | Kintop | 52/96 |
| 6,601,348 B2 | 8/2003 | Banks et al. | |
| 6,606,828 B1 | 8/2003 | Lin et al. | |
| 6,786,015 B2 | 9/2004 | Wilt | |
| 6,786,018 B2 | 9/2004 | Webb et al. | |
| 7,137,224 B2 | 11/2006 | Rasmussen et al. | |
| 7,487,618 B2 | 2/2009 | Lin | |
| 7,587,867 B2 * | 9/2009 | Weber | 52/202 |
| 2001/0027625 A1 * | 10/2001 | Webb et al. | 52/96 |
| 2002/0083666 A1 | 7/2002 | Webb et al. | |
| 2002/0124485 A1 | 9/2002 | Pulte | |
| 2003/0061771 A1 | 4/2003 | Kintop | |
| 2005/0210759 A1 | 9/2005 | Austin et al. | |
| 2006/0248810 A1 | 11/2006 | Ewing | |
| 2007/0113489 A1 | 5/2007 | Kaiser et al. | |
| 2008/0083171 A1 * | 4/2008 | Graf | 52/57 |

FOREIGN PATENT DOCUMENTS

| | | |
|---|---|---|
| JP | 6-307122 | 11/1994 |
| JP | 6-336860 | 12/1994 |
| JP | 8-49448 | 2/1995 |
| JP | 7-158318 | 6/1995 |
| JP | 8-218683 | 8/1996 |
| JP | 2000-8326 | 1/2000 |
| JP | 2003-206606 | 7/2003 |

OTHER PUBLICATIONS

U.S. Appl. No. 11/187,100, filed Jul. 23, 2005: Specification, Claims, Drawings, Preliminary Amendment, Abstract; Requirement for Restriction/Election dated Feb. 6, 2008; Response to Election dated Apr. 7, 2008; non-final Office Action dated May 13, 2008 (13 pages), Interview Summary dated Jul. 29, 2008 (2 pages); Amendment filed Aug. 8, 2008 (22 pages), Response to Final Office Action filed May 8, 2009 (24 pages); Office Action mailed Dec. 8, 2008 (17 pages); Final Office Action dated May 12, 2010 (14 pages); Response filed Jan. 20, 2010 (36 pages).

International Search Report and Written Opinion of the International Searching Authority, International Application PCT/US07/20556 (filed Sep. 24, 2007) mailed Jul. 21, 2008 (9 pages).

U.S. Appl. No. 11/236,394, filed Sep. 24, 2005: Specification, Claims, Drawings, Preliminary Amendment; Office Action dated Sep. 8, 2008 (5 pages); Response filed Oct. 8, 2008 (10 pages); Amendment filed Apr. 10, 2009 (20 pages); Office Action mailed Dec. 10, 2008 (7 pages).

U.S. Appl. No. 11/098,330, filed Apr. 4, 2005, Specification, Drawings, Preliminary Amendment, Abstract, Claims, Examiner's search strategy and results, Search Information including classification, databases and other search related notes, Bibliographic Data Sheet; Requirement for Restriction/Election (Sep. 18, 2007), and Response to Election/Restriction (Mar. 18, 2008); Final Rejection (Jun. 11, 2008); Amendment After Final (Aug. 29, 2008); Supplemental Notice of Allowability mailed Oct. 17, 2008 and Notice of Allowability mailed on Sep. 29, 2008 (12 pages).

MM Systems Corp. Snap-Lok Coping Systems (Bullnose Coping), Advertising Web Page, Nov. 6, 2000, http: www.colliersf.com/mmcoping.html.

MM Systems Corp., Fascia Systems (Vari-Fascia) Advertising Web Page, Nov. 6, 2000, http: www.colliersf.com/mmfascia.

Lin et al., Supressing Extreme Suction . . . , Conf. Proc. vol. I, The 7th U.S. National Conf. on Wind Engineering, Jun. 27, 1993, p. 413-422, UCLA, Los Angeles, USA.

Surry et al., The Effect of Surroundings and Roof Corner Geometric . . . , Journal of Wind Engineering & Industrial Aerodynamics, Apr. 27, 1995, p. 115-138, vol. 58, Elsevier, Amsterdam, The Netherlands.

Metal-Era, Roof Edge Systems, Catalog No. 79709000, 1997, p. 4, p. 8 & p. 9, Metal-Era, Inc., Waukesha, WI, USA.

Overly Metal Coping, p. 4, Overly Manufacturing Company 1965. (4 pages).

MM Systems Architectural Roof Edge Technologies 2001. (4 pages).

* cited by examiner

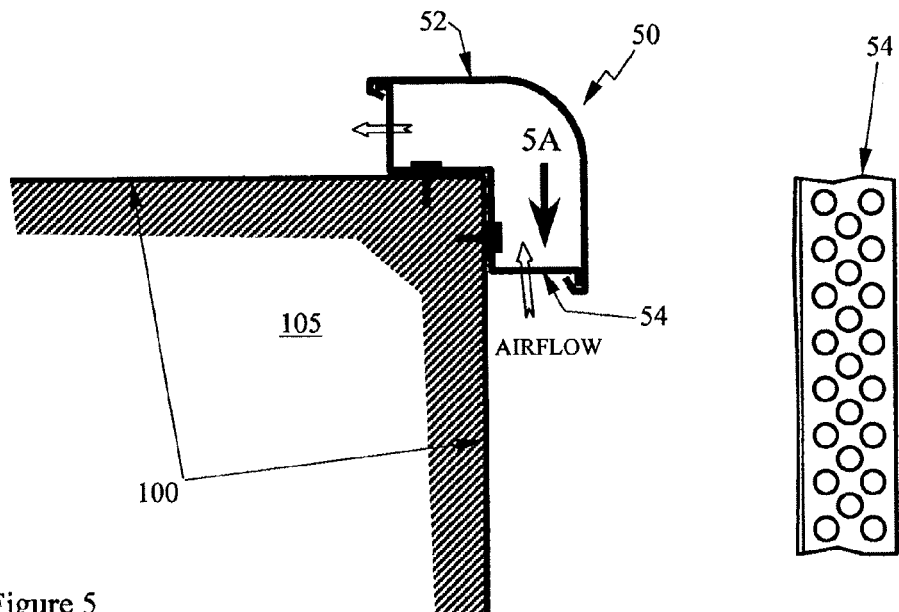
Figure 5
Figure 5A
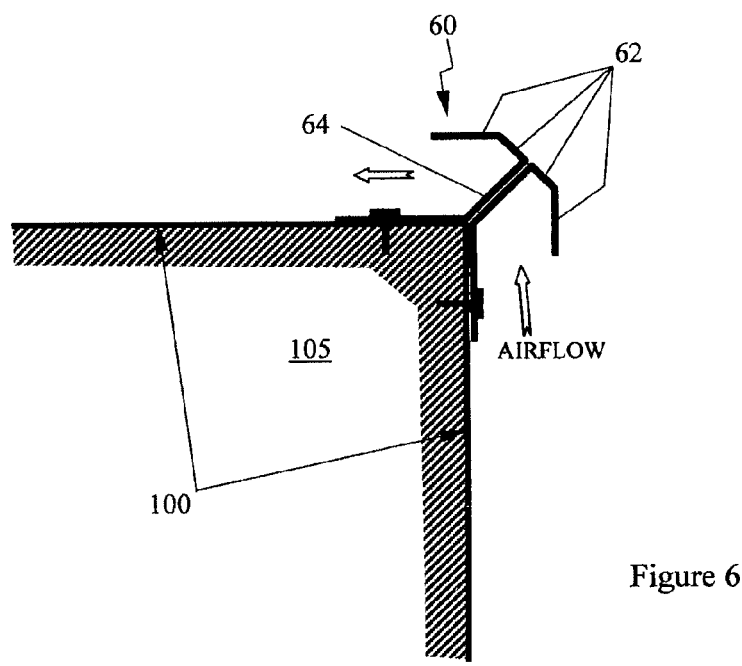
Figure 6

WALL EDGE VORTEX SUPPRESSOR

CROSS-REFERENCE TO RELATED APPLICATIONS

This is a divisional of application Ser. No. 11/286,855, filed Nov. 26, 2005 (incorporated herein by reference) now U.S. Pat. No. 7,823,335, which claims the benefit of U.S. provisional application No. 60/636,083, filed Dec. 15, 2004.

SEQUENCE LISTING

Non-Applicable.

BACKGROUND

1. Field of Invention

This invention relates to an aerodynamic means that mitigate wind generated vortices and wind loads in the wall edge areas of a building, in a simple, effective, and economical way, applicable for both new constructions and retrofits of existing buildings.

2. Discussion of Prior Art

Conventional wall construction practices normally result in a wall edge configuration that tends to generate strong edge vortex and subjects the wall edge area to severe outward suction loads and high risk of wind induced damage. Traditionally, structural strengthening methods have been relied upon, to counter this severe suction force and mitigate damage risk. The wall edge vortex suppressor disclosed herein functions to reduce the suction force and thus mitigates wind damage risk, through passive flow control techniques that eliminate or suppress the wall edge vortex, which is the prime cause for the high suction force.

SUMMARY OF THE INVENTION

This invention discloses an aerodynamic means that mitigate strong vortices and high loads induced by wind on the wall edge area of a building, in a simple, effective, and economical way, applicable and convenient for both new constructions and retrofits of existing buildings.

This is achieved by using elongated devices of appropriate configurations mounted along a wall edge, therefore to intervene with the wind flow and suppress edge vortex. Examples of such configurations include wall edge cap, windscreen and wind spoiler. These devices primarily comprise of elongated members mounted to a wall edge and defining a new exterior configuration of a building corner, and appropriate means to attach and secure the elongated member to a building corner.

Herein wall edge refers to an edge at which two terminating wall surfaces intersect at an approximately right angle and form a convex corner of a building. Vortex formation and extreme wind load are inherent around a building corner, where abrupt change in wall surface orientation occurs along the flow path such that the accelerated wind flow around a corner severely separates from the downstream wall surface. A wall edge vortex suppressor intervenes and modifies the wind flow around the corner of a building. It mitigates flow separation, prevents vortex formation or suppresses its strength, and ultimately reduces the wind force exerted on the wall area adjacent to the edge where most initial wind damages to a wall system occur.

OBJECTS AND ADVANTAGES

Several objects and advantages of the present invention are:

to provide wall edge devices which suppress edge vortex formation and reduce wind loads on wall cladding in a building corner area;

to provide wall edge devices which reduce wind loads generally on a wall system that are transferred from the wall cladding;

to provide wall edge devices which stabilize wind flow around wall corners and minimize cyclic loads on wall components resulting from recurring winds, reducing the chances of damage due to material fatigue;

to provide wall edge devices which possess the desired aerodynamic performance for a more wind resistant building structure while maintaining aesthetic and waterproofing functionality under both extreme and recurring weather conditions.

Further objects or advantages are to provide wall edge devices which protect a wall system from wind and rain damage, and which are still among the simplest, most effective and reliable, and inexpensive to manufacture and convenient to install. These and still further objects and advantages will become apparent from a consideration of the ensuing description and drawings.

BRIEF DESCRIPTION OF THE DRAWINGS

FIG. 5 schematically shows a cross-sectional view for one of the preferred embodiments of wail edge wind spoiler. FIG. 5A is view 5A from FIG. 5, exemplifying an longitudinally continuous support with face perforation for a wind spoiler.

FIG. 6 illustrates an alternative configuration of wall edge wind spoilers.

DESCRIPTION OF THE PREFERRED EMBODIMENTS

Figure 1:
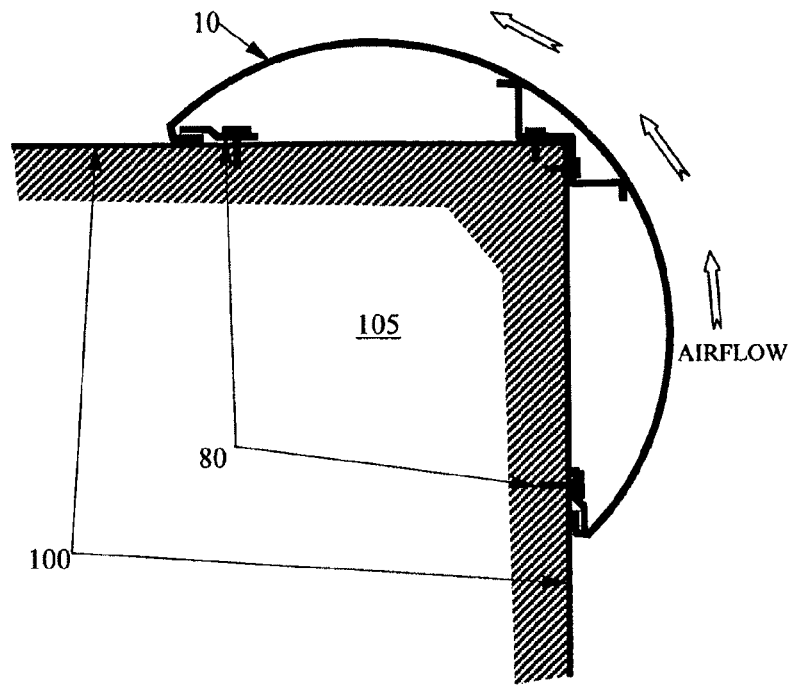
FIG. 1 schematically shows a cross-sectional view for one of the preferred embodiments of wall edge cap, being mounted to both sides of a wall edge.

FIG. 1 illustrates a preferred configuration of wall edge cap 10, in a cross-sectional top view. The wall edge cap's arch shape, or any other similar shape of gradual slope change or modest curvature, eliminates or reduces the abrupt change in surface orientation along the flow path around a building corner 105 where two exterior wall surfaces 100 intersect. This will mitigate edge vortex formation and result in the reduction of aerodynamic forces, primarily the outward suction force, exerted on the downwind wall areas adjacent to the edge. Multiple straight segments can also be used to approximate an arched exterior shape for a wall edge cap. The exterior surfaces of the wall edge cap can be optionally perforated to enhance the device's vortex-suppressing effects, as described for edge screens later in this application.

Any appropriate means to attach and secure the devices to wall surfaces are allowable if it does not significantly affect or alter the exterior shape of the device in a way that detriments the vortex-suppressing function. For example, a set of cleats and fasteners 80 as illustrated in FIG. 1 can be used for securing the apparatus.

Figure 2:
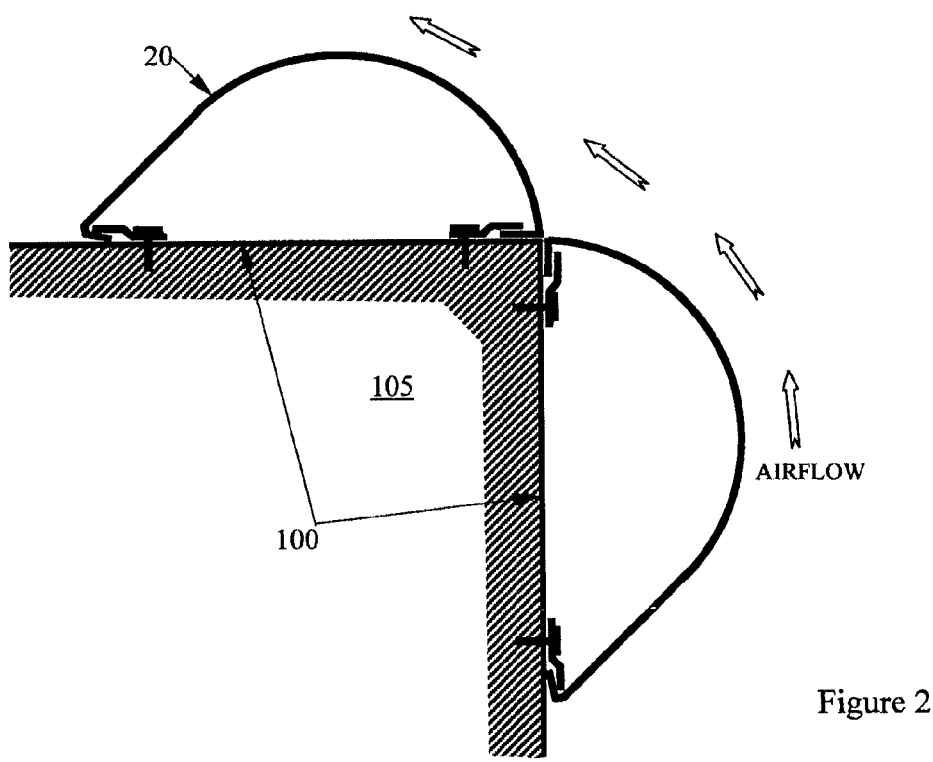
FIG. 2 illustrates an alternative configuration of wall edge caps, being mounted to each side of a wall edge separately.

FIG. 2 shows an alternative configuration of a wall edge cap assembly 20 that functions in a similar fashion as that illustrated in FIG. 1. Multiple straight segments can also be used to approximate the curved exterior shape.

Figure 3:
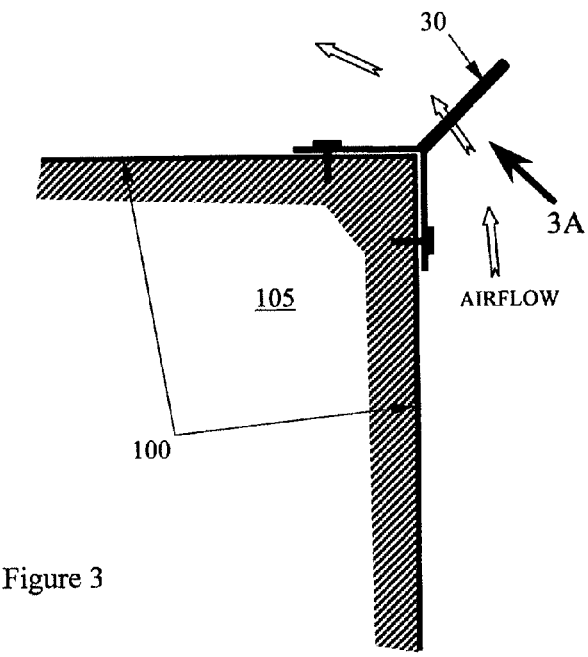
FIG. 3 schematically shows a cross-sectional view for one of the preferred embodiments of wall edge windscreen.
Figure 3A:
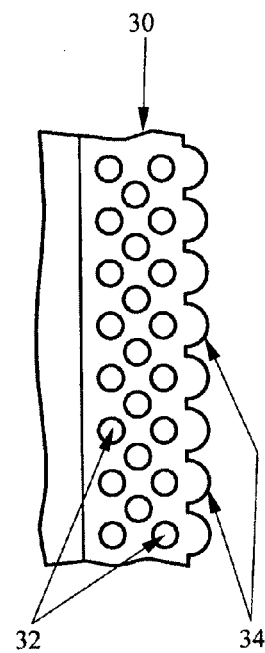
FIG. 3A is view 3A from FIG. 3, exemplifying face perforation and edge serration of a windscreen.

FIG. 3 illustrates a preferred configuration of wall edge screen 30 in a cross-sectional top view. The perforated face protrudes outwardly from the wall corner 105, preferably along the axis of symmetry. The wall edge screen employs a venting mechanism to suppress the vortex formation and vortex induced suction force. The perforated face of a wall edge screen generally reduces the flow acceleration around the corner. At the same time it facilitates pressure equalization across the screen face and around the wall corner 105 through a "bleeding" or venting effect, which prevents vortex formation around and behind the outer edge of the windscreen. It also breaks the flow around the corner down to small, random and unorganized eddies, and leads to dissipation of kinetic energy. Optional outer edge serration of the windscreen provides similar effects of flow breakdown and kinetic energy dissipation. View 3A form FIG. 3 is shown in FIG. 3A to illustrate an example for face perforation and edge serration of a wall edge windscreen.

Figure 4:
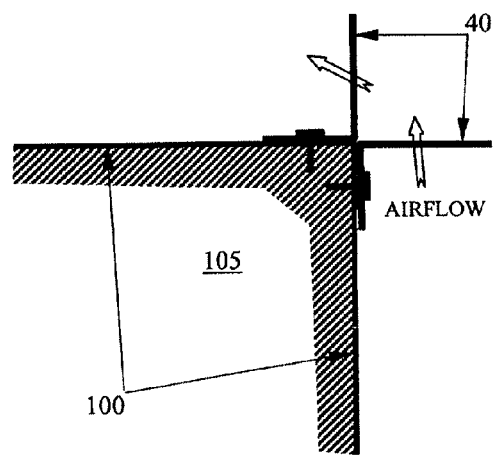
FIG. 4 exemplifies alternative configuration of wall edge windscreens.

FIG. 4 shows an alternative configuration of a wall edge windscreen assembly 40. The perforated faces form an approximately symmetrical arrangement, each forming an angle to a wall 100. Although, the perforated face shown here forms a right angle to a wall surface, the acceptable angles range from the limit case as in FIG. 3 (aligning with axis of symmetry) to that of about 45° with respect to the wall on the same side.

FIG. 5 illustrates a preferred configuration of wall edge wind spoiler 50, again in a cross-sectional top view. The wind spoiler uses yet another mechanism to mitigate vortex formation around a wall corner 105 of a building. The raised and bent spoiler plate 52 forces the wind flow around the wall corner to conform approximately to the exterior wall surfaces, and thus suppresses flow separation and vortex formation. The resulting effect is the reduction of the wind suction force on the wall area downwind of the wall corner 105. A plurality of methods is suitable for supporting the raised spoiler plate to the wall corner, as long as the support members do not collectively obstruct the airflow path between the raised spoiler plate and the wall corner. A preferred option is to use significantly perforated, longitudinally continuous, plate-like supports 54 as exemplified in FIG. 5A, which provide additional effects of flow breakdown and kinetic energy dissipation as described above for edge windscreens.

FIG. 6 shows an alternative configuration to form an edge wind spoiler assembly 60. The raised and bent plates 62 can be configured with multiple straight segments as shown herein or with curved ones. The end segment of the raised plate shall preferably be approximately in parallel with one of the walls 100 secured thereto. The perforated double plates 64 serve as supports to the raised plate segments and as a corner wind screen.

The devices can be made of any durable materials that provide mechanical strength and stiffness sufficient to sustain high winds and other weather elements over time. These include, but are not limited to, sheet metal, acrylic, and for the edge cap treated solid wood, etc. Extrusion, or cold form where applicable or other appropriate methods, can be used to manufacture the devices. A generally symmetric shape is preferred for a wall edge vortex-suppressing device in that wind can come from either side of a building corner. However, deviation from a symmetric configuration is allowable for any practical purposes as far as the alteration does not deviate from the spirit of this disclosure for wall edge vortex-suppressing devices.

Installation and Operation

Any appropriate means to attach and secure the devices to wall surfaces are allowable if it does not significantly affect or alter the exterior shape of the device in a way that detriments the vortex-suppressing function. For example, a set of cleats and fasteners can be used for securing the apparatus to the wall, as illustrated in the above figures.

An embodiment of this invention is a passive flow control device for wall edges. Once configured and installed properly, it stays functioning in such a way that it mitigates vortex formation around a wall edge and reduces wind loads on the wall, whenever the wind blows towards a building bearing such wall edge devices, and requires no active operational intervention.

CONCLUSION, RAMIFICATIONS, AND SCOPE

It is apparent that wall edge vortex suppressors of this invention provide advantageous devices for mitigating wall edge vortex and wall suction, and are still among the simplest, most effective and reliable, inexpensive to manufacture and convenient to install, with little, if any, maintenance required.

The present invention provides a simple and unique method for improving building wind resistance, not only suitable for new constructions but also for retrofit on existing buildings.

Although the description above contains many specifications, these should not be construed as limiting the scope of the invention but as merely providing illustrations of some of the presently preferred embodiments of this invention. Various changes, modifications, variations can be made therein without departing from the spirit of the invention. Wall edge vortex suppressors can be made of any reasonably durable material with any appropriate means of fabrication as long as a configuration according to the spirit of this invention is accomplished to support the described working mechanism and to provide the associated functionality. Any appropriate conventional or new mounting method can be used to secure a wall edge vortex suppressor to a building corner without departing from the spirit of this invention. Thus the scope of the invention should be determined by the appended claims and their legal equivalents, rather than by the examples given.

What I claim as my invention is:

1. An elongated apparatus disposed longitudinally along a building-exterior region in which substantially planar and substantially vertical exterior wall surfaces extend to an outside corner of a building and define part of an exterior of the building, the outside corner of the building extending in a substantially vertical direction, the apparatus comprising:
    a mounting portion attached to at least one of the exterior wall surfaces, and
    at least one substantially planar portion extending outwardly from the mounting portion, wherein the at least one substantially planar portion includes at least one of perforations and an edge serration;
    wherein the apparatus is configured to suppress wind-generated vortex formation and to reduce wind-generated suction force adjacent to the outside corner of the building.

2. The apparatus of claim 1, wherein the at least one substantially planar portion extends from the mounting portion to a free end defined by the at least one substantially planar portion.

3. The apparatus of claim 2, wherein the free end of the at least one substantially planar portion includes the edge serration.

4. The apparatus of claim 3, wherein the at least one substantially planar portion includes the perforations.

5. The apparatus of claim 1, wherein the at least one substantially planar portion includes the perforations.

6. The apparatus of claim 1, wherein the at least one substantially planar portion extends from the mounting portion in a direction substantially parallel to a plane that bisects the outside corner of the building.

7. The apparatus of claim 1, wherein the mounting portion includes a first mounting part attached to one of the exterior wall surfaces and a second mounting part attached to another one of the exterior wall surfaces.

8. The apparatus of claim 1, wherein the at least one substantially planar portion includes a first substantially planar portion extending away from the building in a first direction and a second substantially planar portion extending away from the building in a second direction different from the first direction.

9. The apparatus of claim 8, wherein the first direction defines an angle of approximately 90 degrees with respect to one of the exterior wall surfaces and wherein the second direction defines an angle of approximately 90 degrees with respect to another one of the exterior wall surfaces.

10. The apparatus of claim 8, wherein the first and second substantially planar portions are substantially symmetrically arranged about a plane that bisects the outside corner of the building.

11. The apparatus of claim 8, wherein the mounting portion includes a first mounting part attached to one of the wall surfaces and a second mounting part attached to another one of the wall surfaces, and wherein the first substantially planar portion extends from the first mounting part and the second substantially planar portion extends from the second mounting part.

12. The apparatus of claim 8, further comprising an outwardly-spaced portion configured to define a flow path directing wind around the outside corner of the building, wherein the first and second substantially planar portions support the outwardly-spaced portion with the outwardly-spaced portion being spaced outwardly away from the exterior of the building, and wherein the first and second substantially planar portions include perforations.

13. The apparatus of claim 12, wherein the outwardly-spaced portion includes a curve or bend in a plane substantially perpendicular to the exterior wall surfaces.

14. The apparatus of claim 1, further comprising an outwardly-spaced portion configured to define a flow path directing wind around the outside corner of the building, wherein the at least one substantially planar portion supports the outwardly-spaced portion with the outwardly-spaced portion being spaced away from the exterior of the building, and wherein the at least one substantially planar portion includes perforations.

15. The apparatus of claim 1, wherein the at least one substantially planar portion includes first and second substantially planar portions extending from the building and being substantially parallel to one another, wherein each of the first and second substantially planar portion includes perforations.

16. The apparatus of claim 1, further comprising a first outwardly-spaced part and a second outwardly-spaced part extending in substantially opposite directions from the at least one substantially planar portion, wherein the first and second outwardly-spaced parts define a flow path directing wind around the outside corner of the building.

17. The apparatus of claim 16, wherein each of the first and second outwardly-spaced parts includes a curve or bend in a plane substantially perpendicular to the exterior wall surfaces.

18. The apparatus of claim 16, wherein each of the first and second outwardly-spaced parts includes a segment approximately parallel to a respective one of the exterior wall surfaces.

19. An elongated apparatus configured to be disposed longitudinally along a building-exterior region in which substantially planar and substantially vertical exterior wall surfaces extend to an outside corner of a building and define part of an exterior of the building, the outside corner of the building extending in a substantially vertical direction, the apparatus comprising:
   an outwardly-spaced portion; and
   an outwardly extending support portion arranged to support the outwardly-spaced portion;
   wherein the apparatus is configured to be attached to at least one of the exterior wall surfaces;
   wherein the outwardly-spaced portion is configured to define a channel around the outside corner of the building between the outwardly-spaced portion and the exterior wall surfaces, the channel having a first open end along one of the exterior wall surfaces and a second open end along another one of the exterior wall surfaces;
   wherein said outwardly extending support portion is defined by discrete sections along the length of the apparatus or is continuous with a plurality of perforations defined therein; and
   wherein the apparatus is configured to suppress wind-generated vortex formation and to reduce wind-generated suction force adjacent to the outside corner of the building.

20. The apparatus of claim 19, wherein the outwardly-spaced portion includes perforations.

21. The apparatus of claim 19, wherein the outwardly extending support portion includes perforations.

22. The apparatus of claim 19, wherein the outwardly extending support portion is substantially planar.

* * * * *